(12) United States Patent
Abramov

(10) Patent No.: US 10,852,700 B2
(45) Date of Patent: Dec. 1, 2020

(54) WEARABLE SMART WATCH WITH A CONTROL-RING AND A USER FEEDBACK MECHANISM

(71) Applicant: Andrey Abramov, Foster City, CA (US)

(72) Inventor: Andrey Abramov, Foster City, CA (US)

( * ) Notice: Subject to any disclaimer, the term of this patent is extended or adjusted under 35 U.S.C. 154(b) by 119 days.

(21) Appl. No.: 15/565,902

(22) PCT Filed: Apr. 11, 2016

(86) PCT No.: PCT/US2016/026857
§ 371 (c)(1),
(2) Date: Oct. 12, 2017

(87) PCT Pub. No.: WO2016/168097
PCT Pub. Date: Oct. 20, 2016

(65) Prior Publication Data
US 2018/0052428 A1 Feb. 22, 2018

Related U.S. Application Data

(60) Provisional application No. 62/146,359, filed on Apr. 12, 2015.

(51) Int. Cl.
| | |
|---|---|
| *G04G 21/00* | (2010.01) |
| *G04G 21/08* | (2010.01) |
| *G04G 3/00* | (2006.01) |
| *G04G 21/04* | (2013.01) |
| *G04B 19/28* | (2006.01) |
| *G04B 47/00* | (2006.01) |
| *G06F 1/16* | (2006.01) |
| *G06F 3/0362* | (2013.01) |

(Continued)

(52) U.S. Cl.
CPC .......... *G04G 21/00* (2013.01); *G04B 19/283* (2013.01); *G04B 47/00* (2013.01); *G04C 3/001* (2013.01); *G04G 21/04* (2013.01); *G04G 21/08* (2013.01); *G06F 1/163* (2013.01); *G06F 1/1684* (2013.01); *G06F 3/016* (2013.01); *G06F 3/0362* (2013.01)

(58) Field of Classification Search
CPC ...... G04G 21/08; G04G 21/00; G04B 19/283; G04B 47/00; G04C 3/001
See application file for complete search history.

(56) References Cited

U.S. PATENT DOCUMENTS

| | | |
|---|---|---|
| 6,556,222 B1 | 4/2003 | Narayanaswami |
| 2005/0050476 A1 | 3/2005 | SanGiovanni |
| 2006/0092177 A1 | 5/2006 | Blasko |

(Continued)

FOREIGN PATENT DOCUMENTS

WO 2012119085 A1 9/2012

OTHER PUBLICATIONS 16780504.3, Extended European Search Report and Opinion, dated Dec. 7, 2018, 8 pages.

(Continued)

*Primary Examiner* — Edwin A. Leon
*Assistant Examiner* — Jason M Collins
(74) *Attorney, Agent, or Firm* — Han Santos, PLLC

(57) ABSTRACT

A wearable device or a smart watch with a control mechanism that allows efficient user interaction by a combination of means including a control-ring subsystem, with visual and haptic feedback subsystems.

20 Claims, 11 Drawing Sheets

(51) Int. Cl.
G06F 3/01 (2006.01)
G04C 3/00 (2006.01)

(56) References Cited

U.S. PATENT DOCUMENTS

| | | |
|---|---|---|
| 2006/0255683 A1 | 11/2006 | Suzuki et al. |
| 2012/0070805 A1 | 3/2012 | Wong et al. |
| 2012/0319981 A1 | 12/2012 | Habas |
| 2013/0149674 A1 | 6/2013 | Anderson et al. |
| 2014/0139422 A1* | 5/2014 | Mistry ............... G06F 3/014 345/156 |
| 2015/0009784 A1* | 1/2015 | Cho .................. G04G 21/08 368/224 |
| 2015/0029826 A1* | 1/2015 | Antognini ........... G04G 9/0064 368/10 |
| 2017/0045958 A1* | 2/2017 | Battlogg ............. G06F 3/0362 |

OTHER PUBLICATIONS

International Search Report and Written Opinion dated Jun. 30, 2016 for PCT Application No. PCT/US2016/026857, 12 pages.

* cited by examiner

WEARABLE SMART WATCH WITH A CONTROL-RING AND A USER FEEDBACK MECHANISM

TECHNICAL FIELD

The present invention generally relates to the field of wearable devices, more particularly to the apparatus commonly referred to as "smart watches", the ways of controlling such devices and receiving information and actionable feedback from the same.

BACKGROUND

Smart watches are portable electronic devices, worn like a wristwatch. Such devices are essentially small computers, as they include a processor, some memory, a pixel-addressable digital display, a communication component, the capacity to accept user input, and a capacity to download and execute a variety of application software.

While some of the smart watch functionality, like the recording of the wearer's location and vital signs, can be considered automatic, much of the value has been attached by consumers to the features that involve an explicit human interaction with the smart watch. In fact, a distinction has been drawn in the public's mind between smart bands offering only minimal feedback, and smart watches offering a relatively rich user interface and a complex interaction paradigm.

Technologically, smart watches have evolved from desktop computers by way of smart phones. The relationship is so close that some prominent manufacturers directly base their smart watch products on their smart phone product line: the Apple Watch uses an operating system intimately related to that of an iPhone, while the Samsung Galaxy Gear S smart watch takes unmistakable design cues from Samsung Galaxy phones. Such a level of similarity drives consumer expectations disproportionate to the size of the device.

Most consumers expect a smart watch to install and execute new software, thus adding new functionality whenever the owner so commands, to perform a wide variety of functions beyond the few time-keeping tasks customary for a conventional watch, to give the owner access to the complex data already available on smart phones and the Internet, and to act upon such data and the consumer's needs in fast, effective transactions where the user arrives to a result in a matter of seconds. Yet, due to cultural and technological constraints, smart watches are not augmented by an ecosystem of external controllers, keyboards, joysticks, styli, and such. Smart watches are expected to provide a sufficiently rich and efficient control mechanism right there on the wrist.

While the expectations of functionality are high, the physical constraints, levied on smart watches by custom and tradition are strict indeed. A smart-watch-wearing experience, especially when the device is not in immediate direct use, is expected to be similar to that of a conventional watch: the weight of the watch, the width of the watchband, the dimensions of the display, and the thickness of the watch are driven by expectations formulated over centuries of wearing conventional wrist watches.

Meanwhile, the norms of social behavior apply yet another set of constraints to the smart watch experience: while checking a watch is a more straightforward, consistent, and natural gesture than reaching for a smart phone or a tablet, the gesture itself is far from inconspicuous. In many cultures a person frequently checking a watch would be perceived as one in a hurry, distracted, and not focused on the task at hand. Each check of the watch leads to a brief interruption in social intercourse, and, if frequent, may be considered rude or insulting. In the context of a business meeting such behavior is often seen as unacceptable.

Thus a need exists for a better way for a user to effectively and efficiently control the complex interactions with a smart watch, and for the smart watch to provide user feedback and communicate a wide variety of data and events simply, clearly, rapidly, and with minimal negative social consequences.

BRIEF DESCRIPTION OF THE DRAWINGS

The above and other aspects, features, and benefits of certain embodiments of the present invention will be more apparent from the following description taken in conjunction with the accompanying drawings in which:

FIG. 7a shows the object and the position of the operator's hand before the control-ring is turned, while FIG. 7b shows the object and the position of operator's hand after the control-ring has been rotated.

FIG. 8a demonstrates the list on the display of the smart watch and the position of the operator's hand before a control action is taken, while FIG. 8b depicts the list on the display of the smart watch and the position of operator's hand after the control action.

FIG. 9a demonstrates the set of objects on the display of the smart watch and the position of the operator's hand before a control action is taken, while FIG.

9b depicts the set of objects on the display of the smart watch and the position of the operator's hand after the control action.

Figure 10:
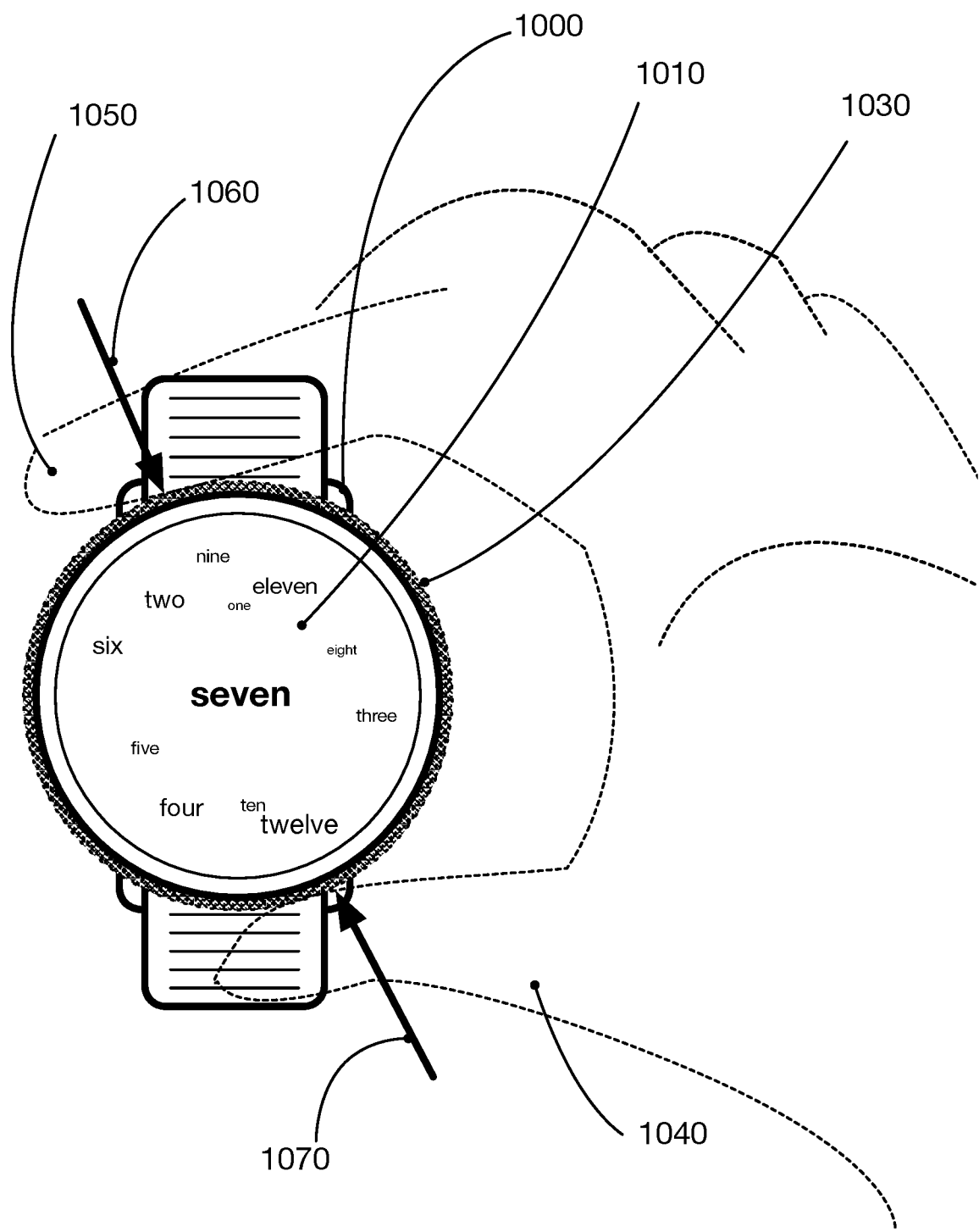

FIG. 10 depicts a smart watch with a control-ring, where the operator is making a selection within the user interface depicted on the digital display of the smart watch by squeezing the control-ring between the thumb and the forefinger.

Figure 11A:
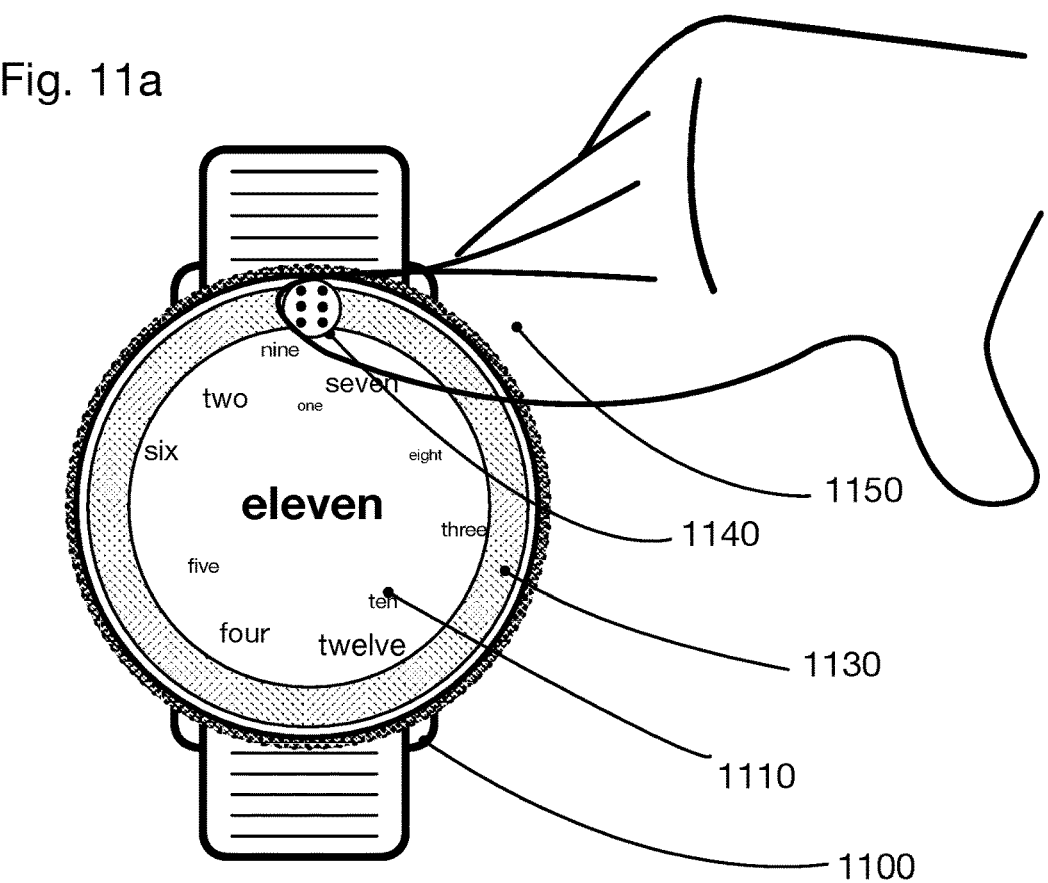
Figure 11B:
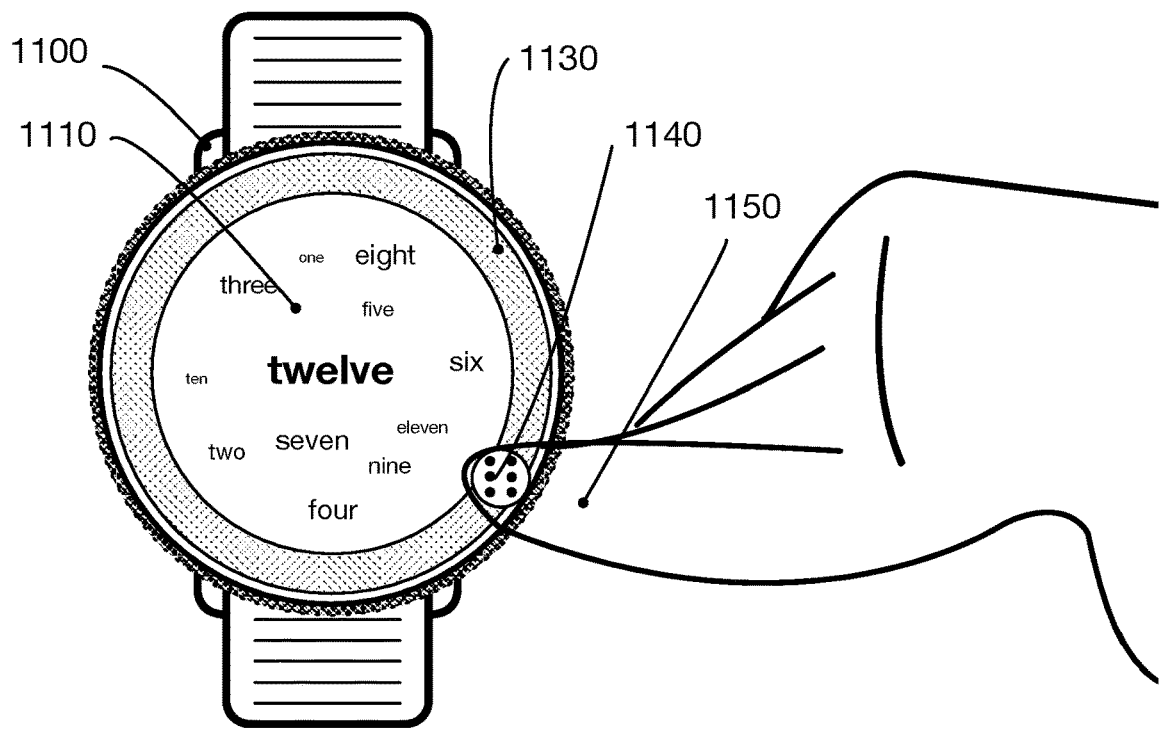

FIG. 11a and FIG. 11b demonstrate an embodiment of the present invention where a free-rotating Braille element is embedded within the front-facing control-ring so as to provide tactile information via the operator's finger. FIG. 11a shows the watch and the user's finger at the beginning of a control operation, while FIG. 11b shows the smart watch with its user interface changed, the control-ring rotated and the Braille cell conveniently located under the operator's finger in the new position.

Figure 12:
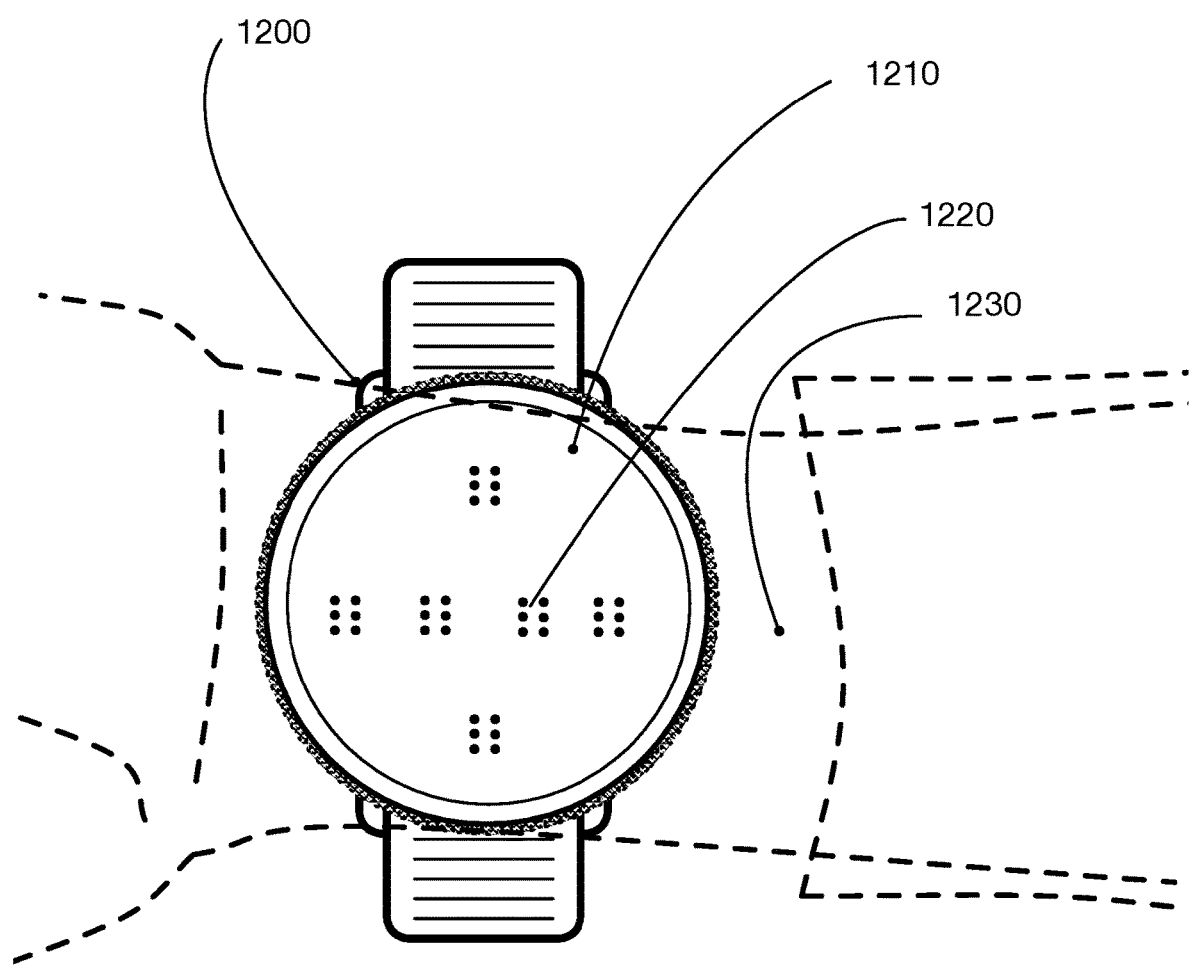

FIG. 12 shows another embodiment of the present invention where multiple Braille cells are embedded in the back plate of a smart watch, so that said Braille cells have distinct positions against the skin of user's wrist and can thus communicate diverse tactile information.

Figure 13:
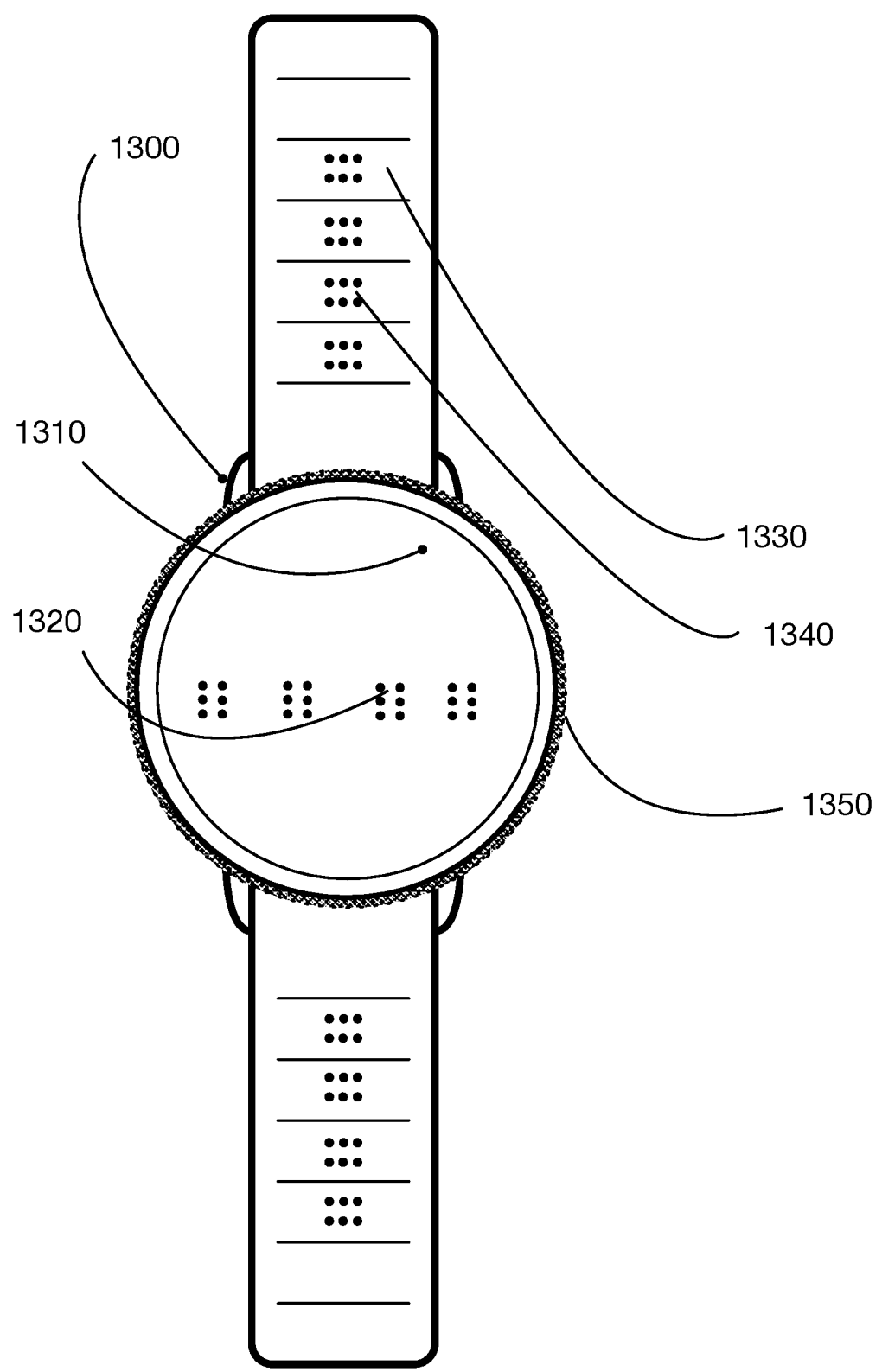

FIG. 13 depicts yet another embodiment of the present invention, where the Braille cells are embedded within the back plate of a smart watch, and yet other Braille cells are embedded within the bracelet attached to the smart watch.

DETAILED DESCRIPTION

Technical Problem

The inevitably constrained physical dimensions of a smart watch and its components impose severe limitations on the amount of data that can be displayed at any one time, as well as the speed and precision with which the operator can navigate through a user interface.

A digital display sized like the dial of a watch, even with an infinitely fine resolution, can only make so much text and graphics visible to a naked human eye. The footprint of an average human finger is about one quarter of the width of a watch's dial, making touchscreen navigation a challenge. Women's and children's fingers are finer in size, but so are their wrists, and thus their watches and their smart watches. Even a stylus with a fine tip does not make the touch screen noticeably more useful, as pointing a stylus with a fine precision requires a sturdy positioning of the hand holding the stylus relative to the touchscreen—a utility the human wrist does not provide.

Similarly, a multitude of button arrangements have been attempted by the industry as a mechanism for controlling a smart watch, and, just like touch screens, have been shown to be convenient in scenarios with highly streamlined and simplified user interfaces, yet lacking in speed of navigation and thus limiting the discoverability of the wide variety of features and services commonly associated with the utility of a smart watch. Even the use of a scroller based on the commonly accepted paradigm of a winding crown of a mechanical watch poses its own challenges, as a winding crown was never designed to be operated while still on the wrist—one takes the watch off to wind it up for a reason.

The use of a digital display as the main output mechanism of a smart watch has been prevalent, as sound alerts are disruptive, and common haptic feedback systems have been limited to a small number of recognizable patterns. Yet the small size of the smart watch display challenges the common paradigm of having the user choose from lists of equally sized, evenly spaced items—a paradigm rightfully accepted on the larger screens of desktop computers, smart phones, and tablets for its simplicity and efficiency, yet clearly restrictive when applied to the tiny display of a smart watch, especially a nonrectangular one.

And so, when the visible options are fewer and the navigation is less certain, the transactions themselves become slower and more inefficient, instigating frustration and increasing the human error rate, thus reducing the utility of a smart watch.

There is a clear contradiction between user expectations of efficiency, driven by the experience with bigger, relatively more mature and thus easier to operate smart phones and tablet, and users' desire for unobtrusive interactions, as demanded by social norms.

What is needed is a smart watch with a new kind of control and feedback mechanism. The operator must be able to navigate through large sets of options rapidly and with high precision, while receiving feedback from the user interface in a clear and socially acceptable way.

SUMMARY OF THE INVENTION

Aspects of the present invention address at least the above-mentioned problems and/or disadvantages and provide at least the advantages described below. Accordingly, an aspect of the present invention introduces a wrist-wearable smart watch with a control-ring and a method for operating the same and receiving information from the smart watch by visual and tactile means, and thus opens a path for improving the efficiency and effectiveness of the user experience.

The invention therefore concerns a wearable smart watch with at least a digital display, a digital controller capable of executing general calculations and data processing under the guidance of an operating system or various application software, an instruction and data memory, a communications subsystem, and a rotating control-ring. At least one sensor assembly is associated with the control-ring and captures a sensor signal generated when an operator rotates, pushes, presses, taps, or otherwise interacts with the control-ring. In a preferred embodiment, the device also includes a tactile feedback subsystem or will communicate with another device capable of providing such tactile feedback to the user.

The interaction of the user with the rotating control-ring is communicated to the controller subsystem of the smart watch, where a general purpose processor, assisted in some embodiments by a specialized controller, interprets the signals, derives the position and rotation velocity of the rotating ring, and uses this data as a basis for application control.

In further embodiments of the invention the rotating control-ring can be combined with other ring controllers, as well as with a number of buttons and functionally similar mechanisms and the wide variety of their states to create a rich control system.

Different algorithms for translating operator's interaction with the control-ring may be used for different software applications and function modes within the same smart watch depending on the user's operating system and application software choices.

In some embodiments the control-ring itself may be caused to rotate by a command triggered by the software executed within the smart watch, such as to reposition the physical indicators incorporated in the control-ring. The control-rings can also be implemented with a digitally controlled variable friction, so as to indicate to the user a change in function or scale associated with the control-ring.

The user interface, as shown on the digital display of the smart watch and as acted upon through the control-ring, may assume a multitude of designs, including but not limited to dials, graphs, text, icons, color and luminescence-based indicators. In one preferred embodiment, where a list or a set of items is presented for the user's selection, the current selection is indicated by making the item more prominent in size, font, shape, shadow, glow effects and such, similar to the popular fish lens and tag cloud effects.

In another embodiment the control-ring has a built-in digital display, so that text and graphics can be shown on the ring. In such an embodiment a selection from a list of options can be achieved by rotating the ring until an item displayed on the ring is positioned against a fixed indicator on the body or the dial of a smart watch, or against a selection indicator shown on the digital display of a smart watch.

In some embodiments the user of the smart watch with a control-ring is provided with tactile feedback implemented via the mechanical properties of the control-ring, or delivered by a digitally controlled tactile feedback subsystem. Both the physical and digital tactile feedback mechanisms are aimed at assisting the user in operating the smart watch by reducing reliance on the display. In some cases the control-ring combined with the tactile feedback mechanisms may be sufficient for guiding a user through a transaction by touch alone—a valuable option in many social settings.

Further tactile feedback can be provided by a smart watch augmented with one or several refreshable Braille cells controlled by the smart watch and capable of indicating the characters of the six point Braille alphabet, eight point ASCII Braille, Computer Braille, Nemeth Braille, Unified English Braille, or some other variation of a tactile alphabet or encoding, enabling the user to receive textual and graphical information by touch alone.

Other aspects, advantages, and salient features of the invention will become apparent to those skilled in the art from the following detailed description, which, taken in conjunction with the drawings, discusses various embodiments of the present invention.

The following detailed description of the invention is intended to assist in a comprehensive understanding of various embodiments of the invention as defined by the claims and their equivalents. Accordingly, those of ordinary skill in the art will recognize that various modifications of the embodiments described herein can be made without departing from the scope and spirit of the current invention. In addition, descriptions of well-known functions and constructions may be omitted for clarity and conciseness.

The detailed description of the invention is to be regarded as merely exemplary in nature and is not intended to limit the invention or the application and uses of the invention. Furthermore, there is no intention that the invention is bound by any theory presented in the preceding background or the following detailed description.

It is to be understood that the singular forms "a," "an," and "the" include plural referents unless the context clearly dictates otherwise. Thus, for example, reference to "a communications subsystem" includes reference to one or more such subsystems.

The following various embodiments describe a wearable smart watch with a control mechanism that allows efficient user interaction by a combination of means including a control-ring subsystem and visual and haptic feedback subsystems and the methods of operating the same.

Figure 1:
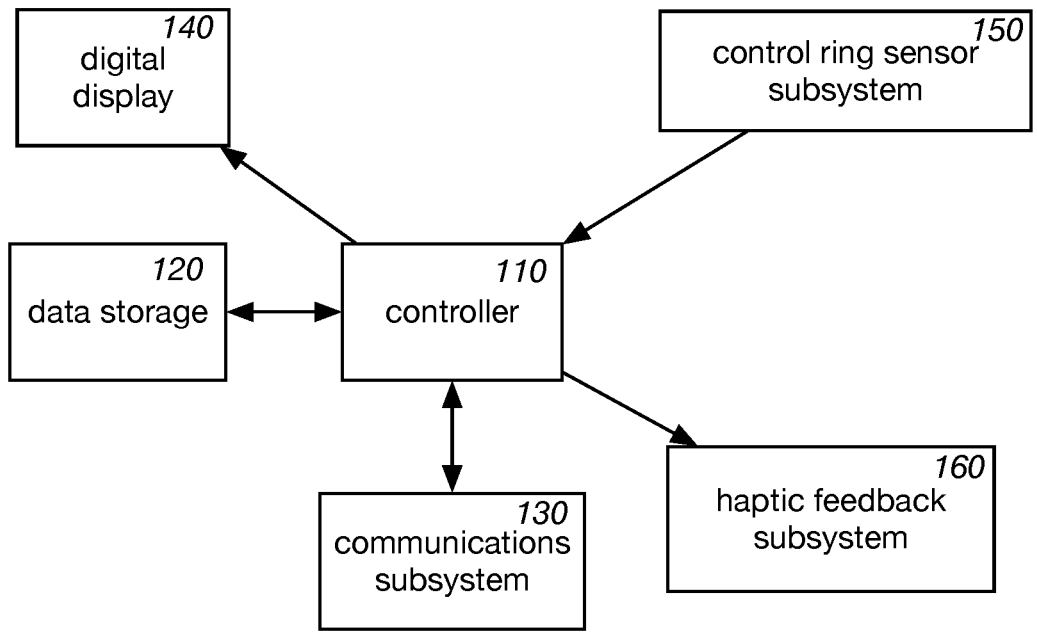
FIG. 1 presents a block diagram of one embodiment of a smart watch including a control-ring sensor subsystem, a tactile feedback subsystem, a controller, a communications subsystem, a data storage subsystem, and a digital display, and the interactions among these components.

FIG. 1 is a block diagram presenting one possible configuration of a digital smart watch, comprising at least controller 110, a data storage 120, a communications subsystem 130, a digital display 140, a control-ring sensor subsystem 150, and a haptic feedback subsystem 160.

The controller 110 may control general operations of the smart watch and a signal flow between the components within. More particularly, it may execute various application and system software residing in the data storage 120 or elsewhere, perform operations on the system and user data residing in the data storage 120 or available over the communications subsystem 130, command the communications subsystem to connect to external devices and services, display the data and user interface elements via the digital display 140, accept and process the inputs generated by the control-ring sensor subsystem 150, and issue commands to the haptic feedback subsystem 160.

Data storage 120 may store program code required for operations according to an embodiment of the present invention, user data, or the like. For example, the storage unit 120 may store the Operating System of the smart watch, the microcode controlling the operation of the communications subsystem 130, of the control-ring sensor subsystem 150, and of the haptic feedback subsystem. The data storage 120 may also contain the software and the data pertaining to the operation of various communications protocols such as IP, Wi-Fi, ZigBee, Bluetooth, Z-wave, LTE, and the like, as well as the additional functions of the smart watch, such as a camera function, a music playback function, an image display function, a video play function, and so on. More particularly, the data storage may contain the user's preferences regarding the interpretation of the events generated by the control-ring sensor subsystem 150, as well as the learned or explicitly specified user preferences for the effects and patterns generated by the haptic feedback subsystem 160.

The communications subsystem 130 may form wireless or wired communication channels with other devices and network services. In fact, multiple, medium-specific communications subsystems can be employed in various embodiments of the present invention. The communications subsystem 130 may use a communication technology such as Ethernet, Universal Serial Bus (USB), Bluetooth, infrared communication, Wi-Fi, Wi-Fi Direct, home RF, DLNA, ZigBee, or the like. More particularly, the communications subsystem 130 may form a communication channel with an external device like a smart ring, smart jewelry, or a mobile phone, with a specific purpose of having said devices provide haptic or audio feedback to the user in response to the commands issued by the controller 110.

The digital display 140 shows the information and user interface presented by the applications and the operating system executed within the controller 110 of the smart watch, information provided by external devices via the communications subsystem 130, or the information based on the inputs generated by control-ring sensor subsystem 150 or by some other sensors and components of the smart watch. For example, the display unit 140 may provide work areas for various applications such as a weather report, a message reader, a digital timer, a control-ring training utility, or a digital camera viewfinder.

Figure 3:
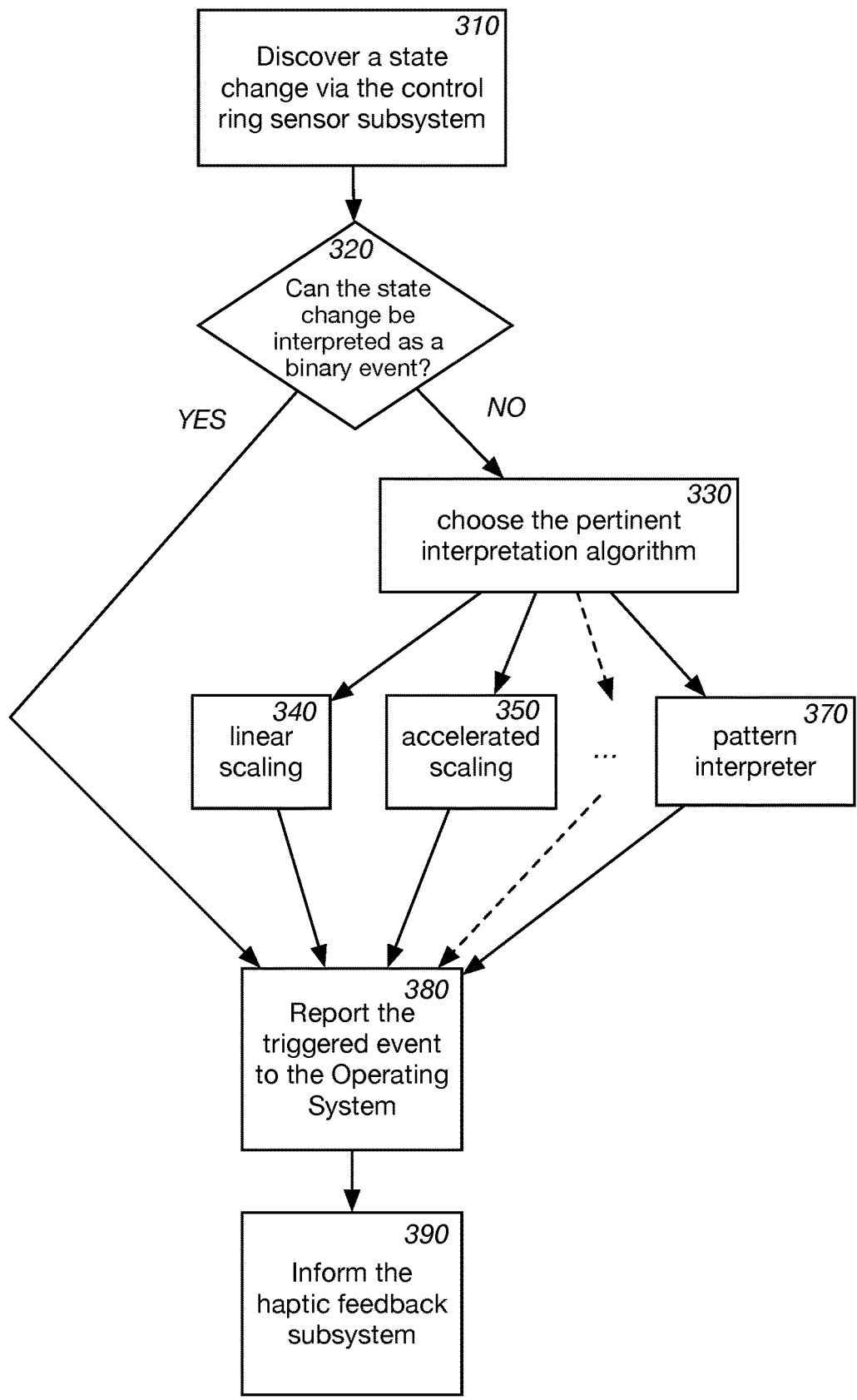
FIG. 3 shows a flow diagram for one embodiment for the method of human interaction of a smart watch disclosed herein, depicting the flow of key events and decisions within the system, triggered by a detected change in the state of the control-ring subsystem.

The control-ring sensor subsystem 150 captures the inputs generated when a user rotates, taps, pushes, squeezes and otherwise operates a control-ring. These inputs are communicated to the controller 110, are interpreted within the context of the prior inputs, the operating system's state, currently active application software, and learned or explicit user preferences. The operating system enables multiple, independent, concurrently active applications to receive appropriate inputs based on mechanisms such as described in Ubiquitous Reach and Remote Control Of Devices: Introducing KPML—A Protocol for Efficient Interaction with Devices, by Dr. Eric Burger, published by VDM Verlag (2008), which is herein incorporated by reference. Based on said interpretation, events are generated by the controller 110 and passed on to the operating system and the application software. FIG. 3 is an illustration of one possible processing flow for the input events generated by the control-ring sensor subsystem 150.

The haptic feedback subsystem 160 drives one or more haptic mechanisms that provide information to the user of the smart watch. Such mechanisms may be simple, like a single-point pressure actuator, or complex, with patterns extended in time and across multiple pressure points. For example, when the controller 110 determines that the user has applied an input to the control-ring, such as a pattern of rotations indicating user's desire to cancel the current operation, the controller 110 may confirm the receipt of the command by sending to the haptic feedback subsystem a predetermined tactile pattern known to the user as "cancel".

Although not illustrated in FIG. 1, the smart watch may further include components for providing additional functions, such as any combination of all or some (or none) of: a camera module for photographing images or video, a microphone for capturing sounds, a broadcasting reception module for receiving broadcasts, a digital music playback module, a sensor module for proximity, acceleration, radiation, and other sensing. This list is not intended to be limiting but is and exemplary list of features. Likewise, one of ordinary skill in the art would know to integrate future sensors and modules into a smart watch such as illustrated in FIG. 1. As well, multiple instances of the same component can be included in the smart watch.

Figure 2:
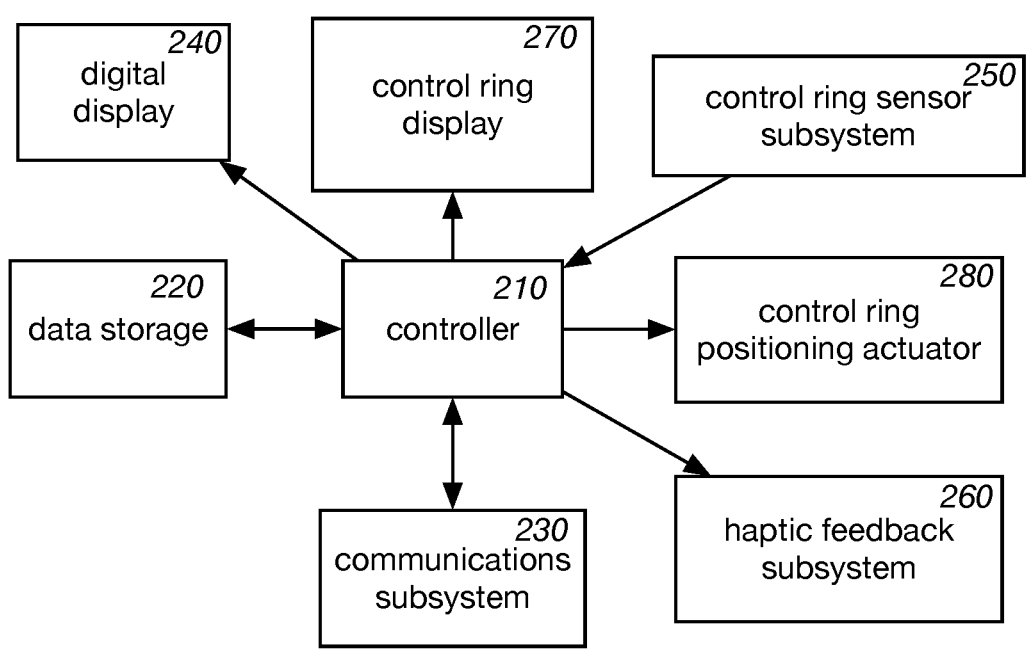
FIG. 2 is a block diagram of another embodiment of a smart watch suitable for the disclosed method of user interaction, said diagram including, among other elements, a control-ring display and a control-ring positioning actuator.

FIG. 2 depicts another embodiment of the invention disclosed herewith. It is similar to the device discussed earlier and illustrated in FIG. 1, comprising at least controller 210, a data storage 220, a communications subsystem 230, a digital display 240, a control-ring sensor subsystem 250, and a haptic feedback subsystem 260. The block diagram shown in FIG. 2 introduces control-ring display 270 and control-ring positioning actuator 280. Each of these elements may be utilized in various embodiments of the present invention independently of each other and have been introduced together in FIG. 2 for the sake of conciseness.

The control-ring display 270 is comprised of a single digital display or multiple display elements built directly into the control-ring. Such elements can be combined with static markers on the body or the dial of the watch, or with imagery shown on the main digital display of the watch, to create a rich user interface. Thus a control-ring display may be used to indicate a choice of options, the progress of an operation over time, a direction, a preferred range of options shown on the main digital display, a moment or a period in time, an alert or a set of alerts, an element of a game, or it may simply act as a decorative element.

The control-ring positioning actuator 280 rotates the control-ring or applies extra friction to the control-ring. The rotation of the control-ring, when commanded not by the user but by the controller 210, can be an efficient mechanism for communicating information to the user of the smart watch. Programmatically controlled rotation of the control-ring may be used to reset the control-ring to a desirable starting position, or to indicate direction, ongoing progress, or, when considered in the context of information shown on the digital display, a virtually unlimited wealth of data. In some embodiments the control-ring positioning actuator 280 can create extra friction perceived by the user operating the control-ring. Such kinesthetic feedback can be utilized to assist the user in high-precision operations, to indicate a change in the scale used, hint at desirable and undesirable or potentially dangerous selections, and to otherwise provide feedback to the user.

FIG. 3 is a flow diagram illustrating a representative flow of events driven by the control-ring mechanism and leading to the generation of user feedback. The process is aimed at interpreting the intent of the user's actions with regard to the control-ring, passing such interpretation to the operating system and the application software of the smart watch, and then providing feedback to the user.

The physical interaction between the operator and the control-ring may be translated into one or any combination of:

position-based control, where a certain fixed position of the ring relative to the case of the watch indicates a certain choice within the user interface of the smart watch;

relative-position control, where the position of the control-ring relative to a certain starting point indicates a choice within the user interface context;

directional control, where the direction of the rotation of the control-ring or the direction of pressure applied by the user to the control-ring is interpreted as an intended user choice;

variance-based control, where the change in the speed or acceleration of movement of the control-ring, or in the pressure applied to the control-ring, is interpreted as an indicator of the operator's choice;

direction change, where reversal or some other abrupt, or sharp, change in the rotation of the control-ring or the pressure applied to the control-ring is interpreted as an event significant within the context of the user interface.

Yet another dimension of control is sensing how tightly the operator presses or squeezes the control-ring. Such information could be interpreted, for example, as an event trigger or an indicator of the user's desire to exert finer control.

For example, FIG. 3 shows the flow when such control is triggered when the device discovers a state change via the control-ring sensor subsystem 310. The state change is reviewed and a decision 320 is made on whether the state change should be interpreted as a binary Yes/No event. Such a binary event would then be directly reported to the operating system at step 380. Alternately the state change becomes a subject of interpretation. At step 330 a pertinent interpretation algorithm is chosen. Such a choice of interpretation mechanism may be driven by the currently active application software, the set of active applications, by explicit user preferences, by the user's recent activity, or by preferences inferred from the user's prior behavior by the operating system, or by other inputs. Once the choice 330 of the pertinent interpretation algorithm is made, said interpretation mechanism, shown in FIG. 3 as one of, but clearly not limited to, linear scaling 340, accelerated scaling 350, and pattern interpreter 370. The result of the interpretation algorithm is used to report 380 the triggered event to the Operating System.

It is up to the operating system to pass the interpreted events to the pertinent application software, and then to inform 390 the haptic feedback subsystem of the desired feedback for the user.

Figure 4:
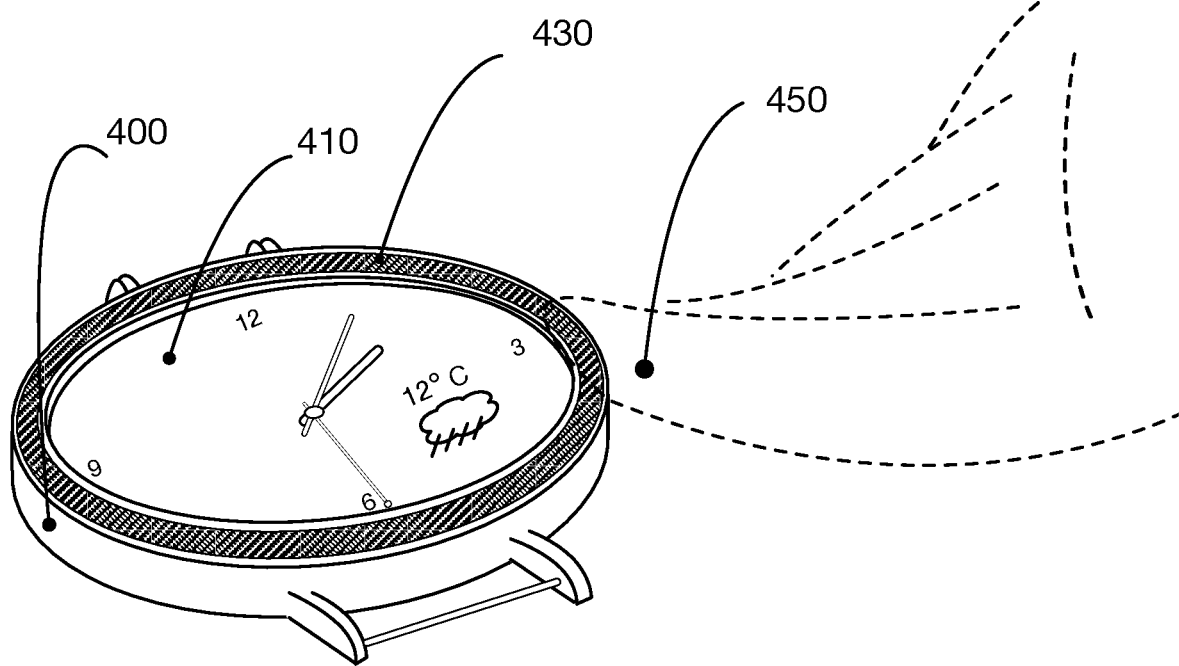
FIG. 4 presents a view of a smart watch with front-facing control-ring.

FIG. 4 shows one potential embodiment of the present invention, one with a watchcase 400, watch face 410, and a control-ring 430 operated by user's finger 450. In this embodiment, the control-ring is facing in the same direction as the watch face. Such an embodiment has the benefit of a user being able to perform multiple rotations of the control-ring without lifting the finger placed on the control-ring.

Figure 5:
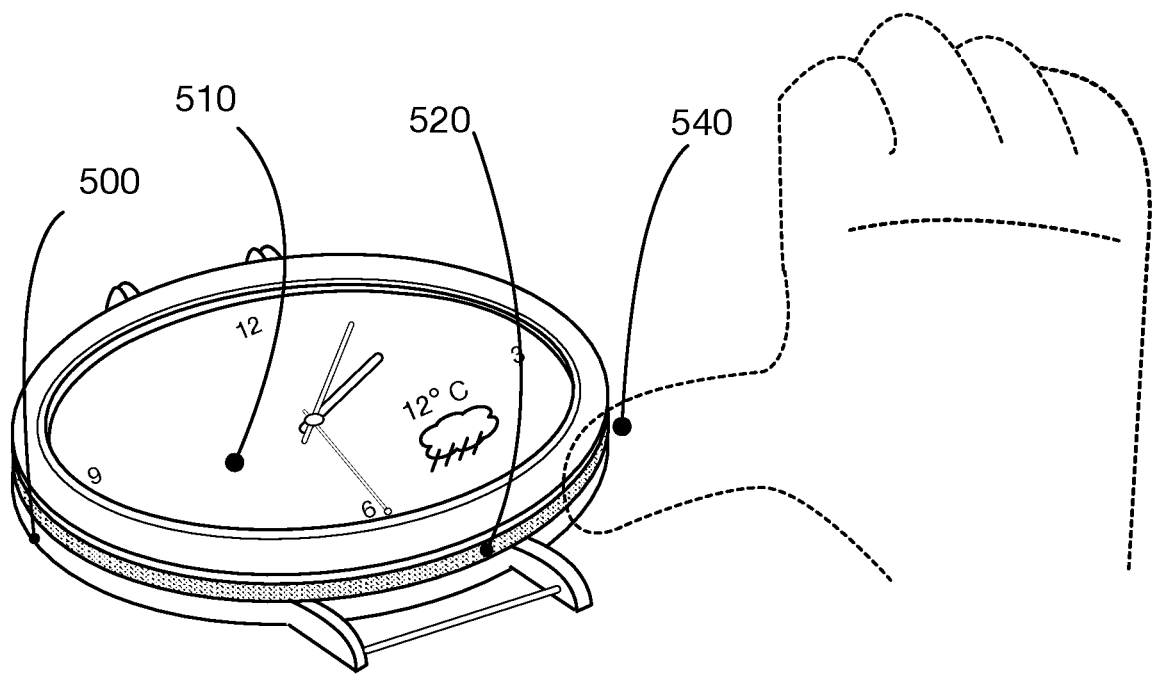
FIG. 5 depicts a smart watch where the control-ring is exposed for operation along the sides of the smart watch.

FIG. 5 illustrates another advantageous embodiment of the present invention, one with a watchcase 500, watch face 510, and a human finger 540 operating the control-ring 520. The control-ring is facing the sides of the watch, making it easier to operate with a thumb or to hold between two fingers for high-precision operations.

Figure 6:
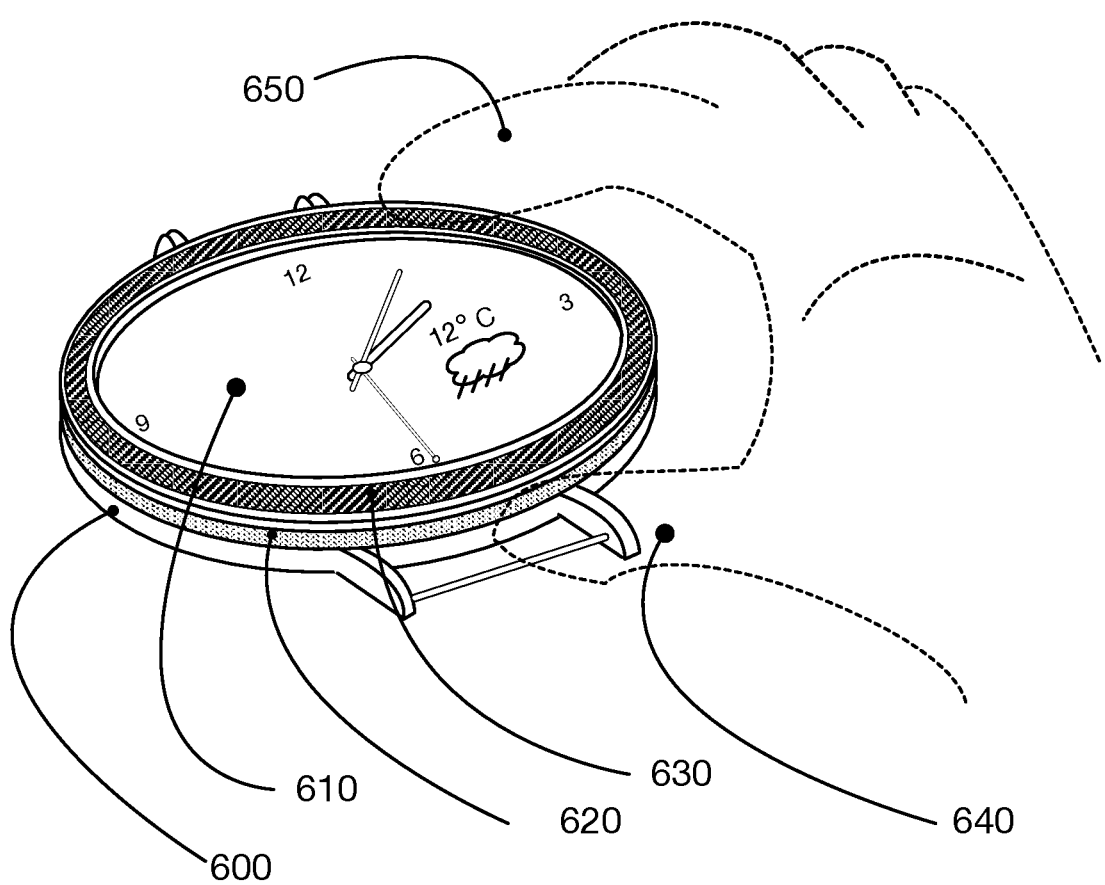
FIG. 6 shows a smart watch with two control-rings: one operated from the direction of the face of the watch, and one exposed along the sides of the watch.

Another embodiment of the present invention is shown on FIG. 6. Here a smart watch 600 with face 610 has both a front-facing control-ring 630 and a side-facing control-ring 620. FIG. 6 shows front-facing control-ring 630 being operated by user's index finger 650 while the side-facing control-ring 620 is operated by user's thumb 640. Thus multiple control-rings can be implemented and operated separately or together as a highly efficient control mechanism.

Figure 7A:
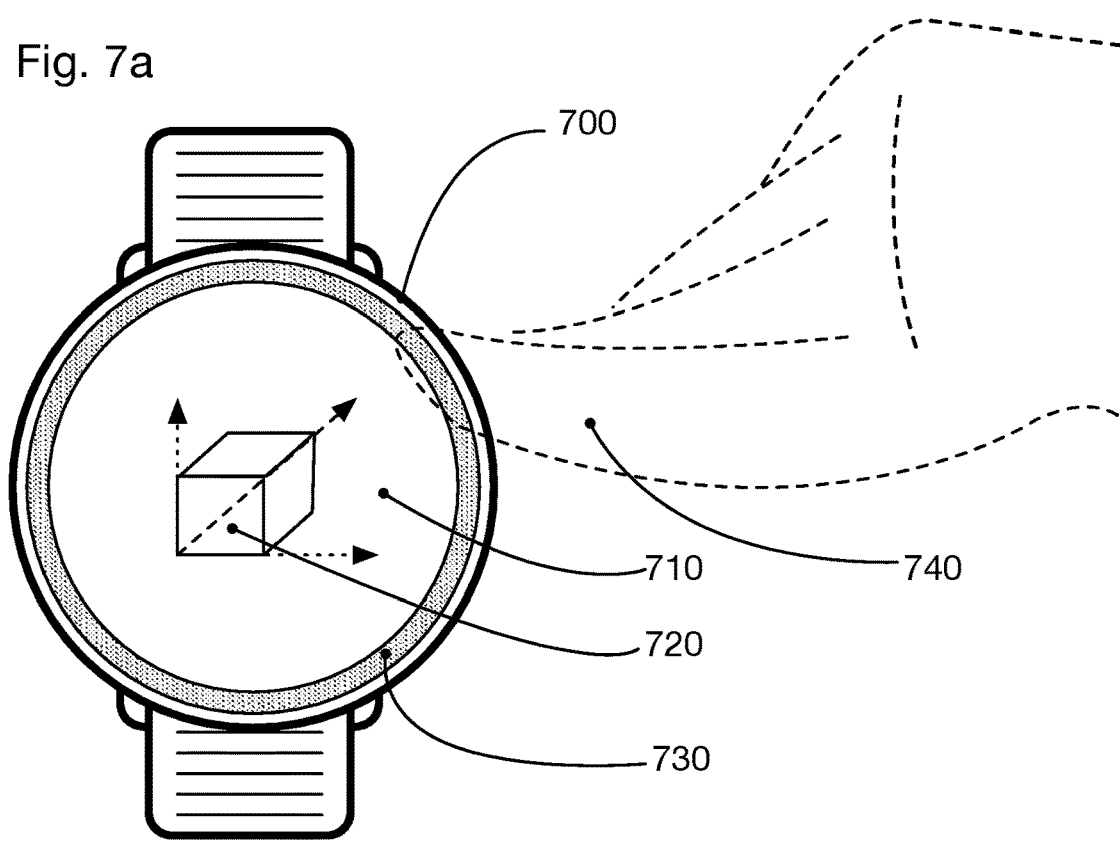
FIG. 7a and FIG. 7b illustrate a control-ring of a smart watch being used to manipulate an object shown on the digital display of the smart watch, where
Figure 7B:
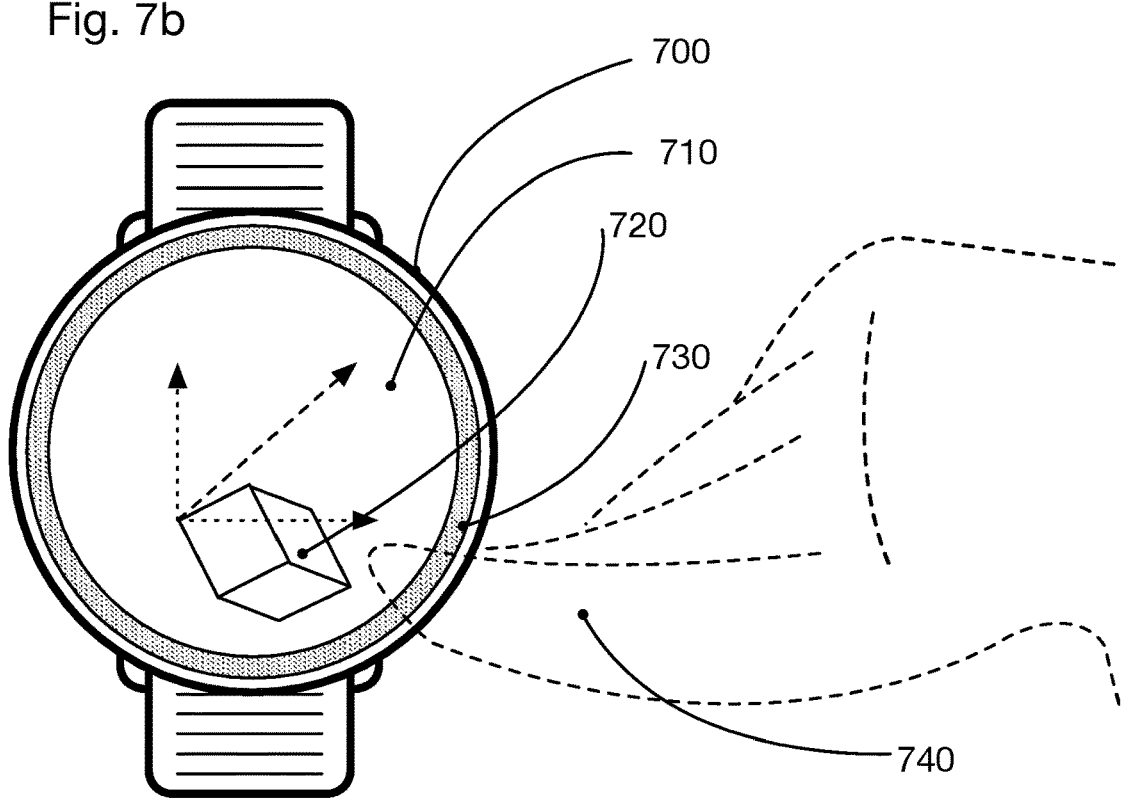

The control-ring lends itself to a wide variety of operations. FIGS. 7a and 7b illustrate one possible embodiment of the present invention, where a smart watch 700 with a display 710 and a control-ring 730 allows the user 740 to manipulate a three-dimensional object 720. FIG. 7a shows the object 720 and user finger 740 positioned at the beginning of an operation, while FIG. 7b shows the object 720 and user finger 740 positioned at the end of the operation.

Figure 8A:
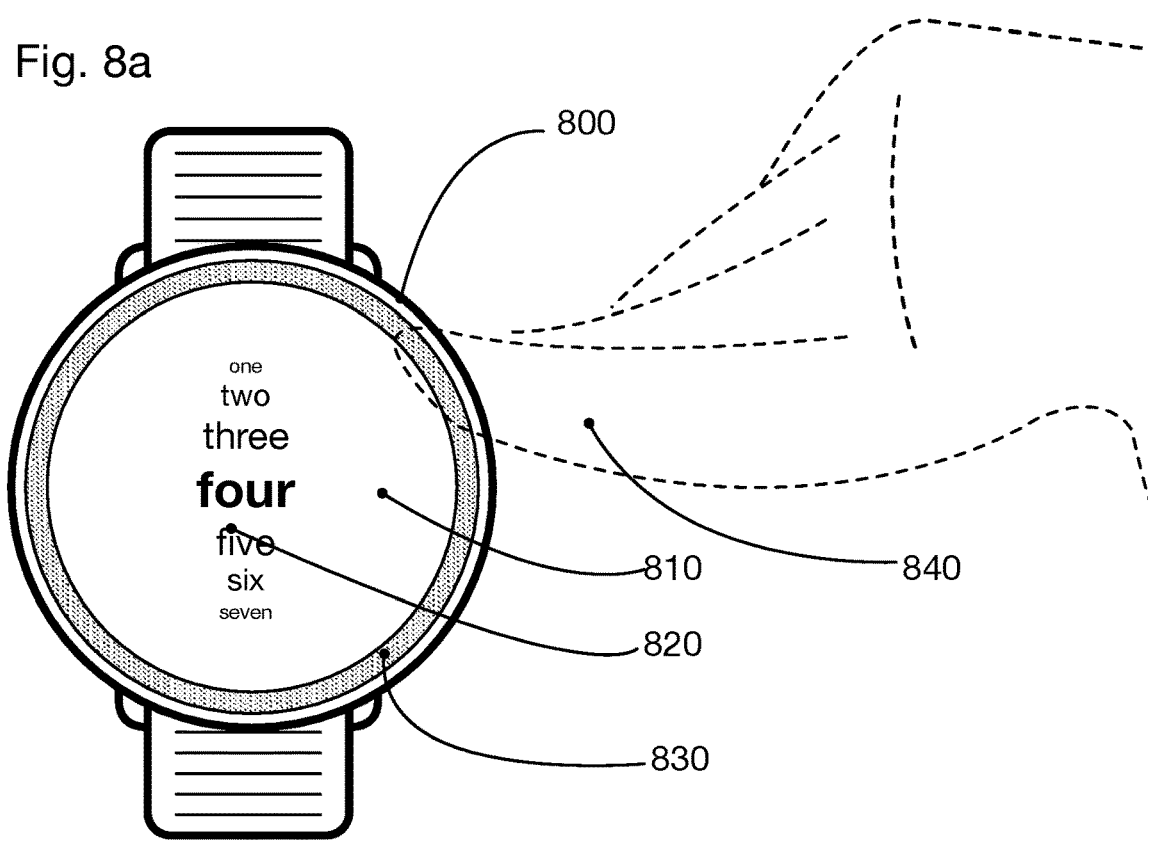
FIG. 8a and FIG. 8b show an embodiment of the current invention where objects in a list are selected by the use of a control-ring, and the currently selected object is indicated by its position on the screen and the prominently emphasized depiction of the object.
Figure 8B:
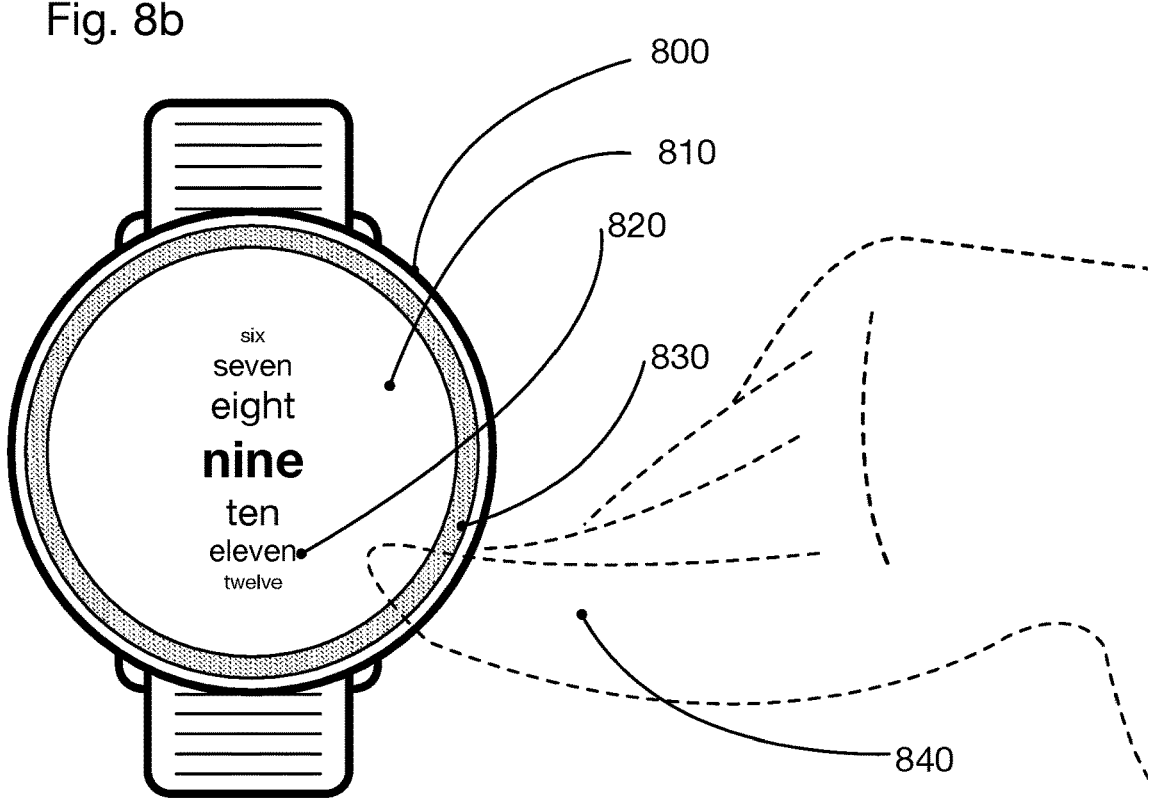

In yet another embodiment of the present invention, shown in FIG. 8a and FIG. 8b, the smart watch 800 with display 810 and a control-ring 830 driven by user finger 840 is depicted facilitating an operation against a list of text items 820. FIG. 8a shows the list 820 and user finger 840 positioned at the beginning of an operation, while FIG. 8b shows the list 820 and user finger 840 positioned at the end of the operation. In this example, feedback about the progress of the operation is given to the user via fish lens effect, where the currently selected item is shown in prominent typography.

Figure 9A:
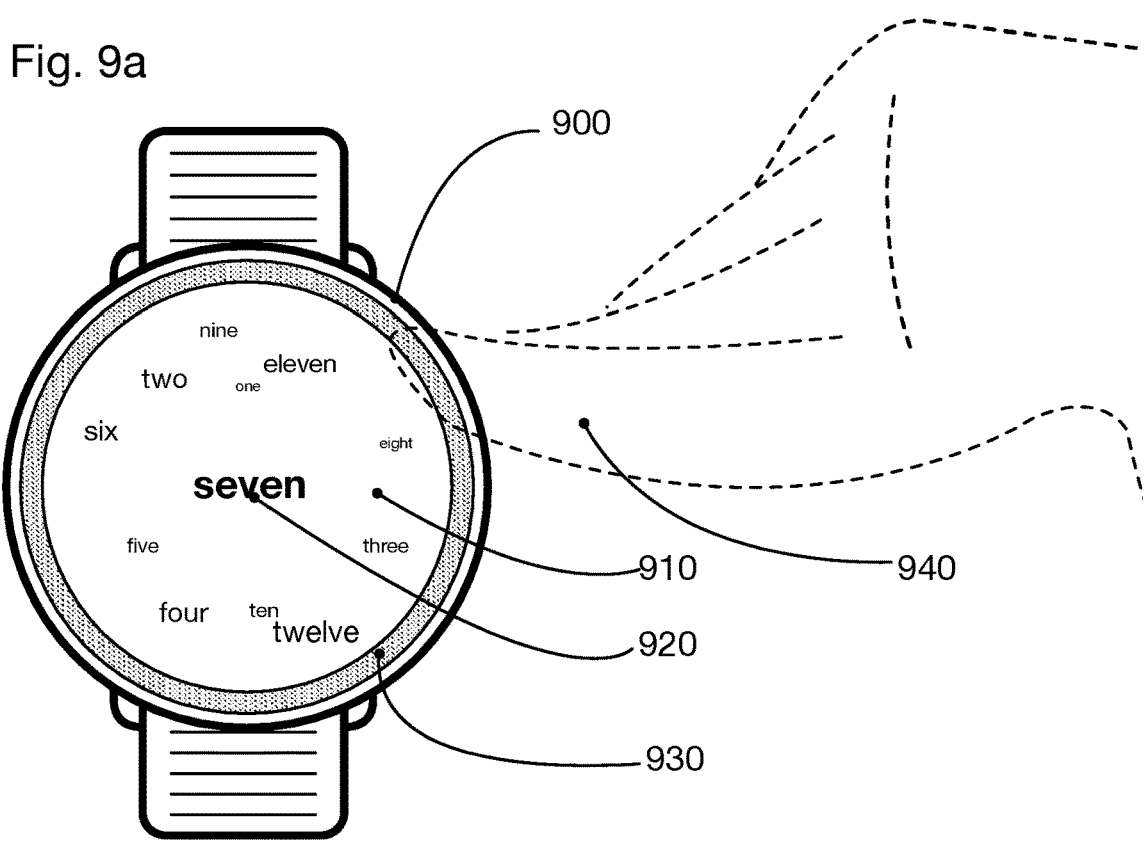
FIGS. 9a and 9b show another embodiment of the present invention where the objects in a set subject to selection via the operation of a control-ring are depicted as floating in space. The currently selected item is indicated by its position on the screen and the prominently emphasized depiction of the selected object.
Figure 9B:
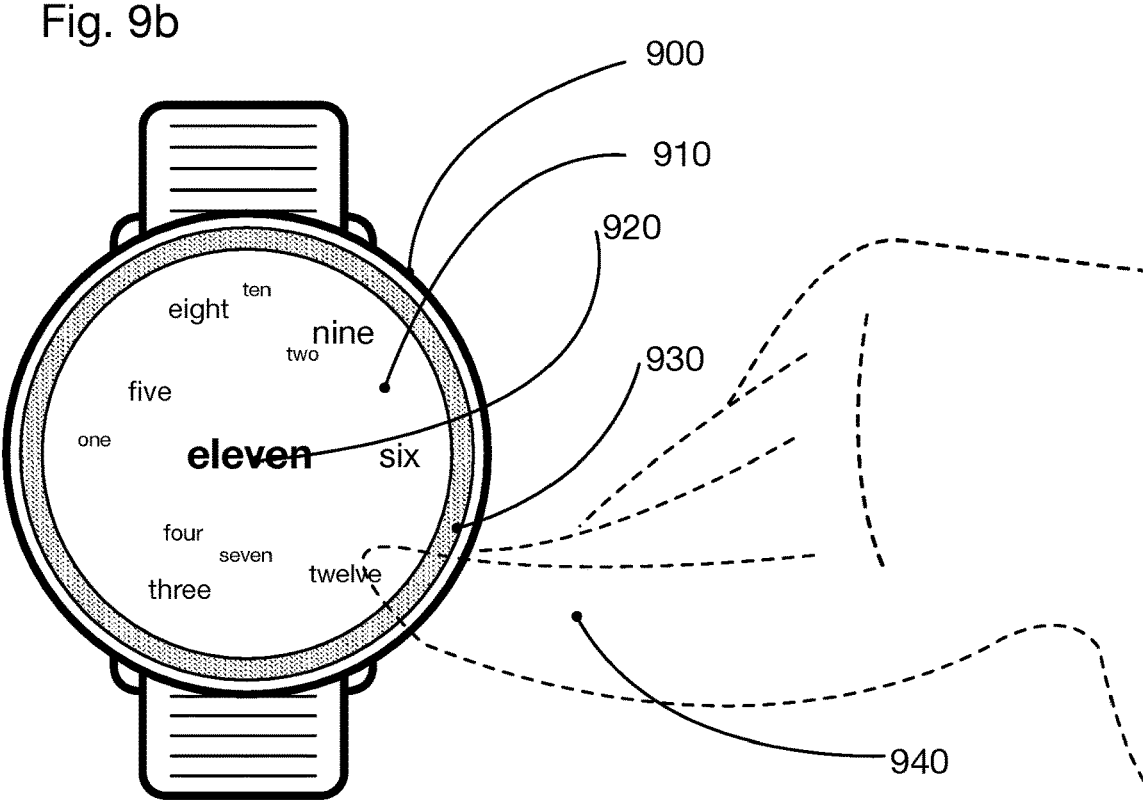

In another advantageous embodiment of the present invention, shown in FIG. 9a and FIG. 9b, the smart watch 900 with display 910 and a control-ring 930 driven by user finger 940 is depicted facilitating an operation against a set of text items 920. FIG. 9a shows the set 920 and user finger 940 positioned at the beginning of an operation, while FIG. 9b shows the set 920 and user finger 940 positioned at the end of the operation. The feedback about the progress of the operation is given to the user via the tag cloud effect, where the currently selected item is shown in prominent typography, while the other elements appear to be floating in space behind it.

In addition to an angular rotation or other movement, the control-ring sensor measures velocity of the movement. In this way the smart watch can distinguish between simply rotating a ring and moving it with a sharp change in velocity, direction, or pressure. By sharp we mean a discontinuity in the rate of change. For example, if the operator is rotating the ring at a rate of 2° per second and then rotates the ring at 10° per second, that is a sharp change in velocity. Likewise, rotating the ring back and forth in a short time frame, like less than 500 milliseconds, is a sharp change in direction.

The control-ring lends itself to user manipulations other than simple rotation. Single or multiple taps against the ring may be interpreted as an input similar to that of a computer mouse, or carrying user command when considered in the context of the location of the tap on the ring and relative to the smart watch itself.

FIG. 10 illustrates yet another advantageous operation using the control-ring 1030 of a smart watch 1000: as the user's index finger 1050 and thumb 1040 apply simultaneous pressure to the control-ring in the directions indicated by the arrows 1060 and 1070, such squeeze interaction can be interpreted as a command to perform an operation against the data set shown on the display 1010.

Tactile feedback is an important element of a wearable smart watch with a control-ring and a user feedback mechanism. The following are descriptions of embodiments of this important element.

In some embodiments the user of the smart watch with a control-ring is provided with a tactile feedback. The control-ring assembly can be constructed to provide for uneven ease of rotation, or with a number of natural resting points. Such points may be spread around the circumference of the control-ring and associated with the significant hour, minute, cardinal directions, a compass rose, or the like. Further tactile feedback may be provided by means of one or more digitally controlled haptic engines included with the smart watch, its bracelet, or an associated device such as smart jewelry or a connected ring. The digitally controlled haptic engines can impart to the user complex tactile patterns and even communicate complex information in Morse code or other encodings. Both the physical and digital tactile feedback mechanisms are aimed at assisting the user in operating the smart watch by reducing reliance on the display. In some cases the control-ring combined with the tactile feedback mechanisms may be sufficient for guiding a user through a transaction by touch alone—a valuable option in many social settings.

FIG. 11a and FIG. 11b show an embodiment of the present invention where the tactile feedback is delivered by a pressure transducer, such as a digitally controlled refreshable Braille cell 1140 incorporated in the control-ring 1130 of the smart watch 1110. As the user rotates the control-ring with a finger 1150 on the Braille cell, the finger receives tactile input in Braille. The Braille cell 1140 is free to rotate relative to the control-ring 1130, so as to maintain a constant orientation relative to the user's finger reading the cell. Such Braille cells can be used for menu selection, user interface feedback, and even reading of messages, alerts, and various texts. FIG. 11a shows the Braille cell 1140 and user finger 1150 positioned at the beginning of an operation, while FIG. 11b shows the Braille cell 1140 and user finger 1150 positioned at the end of the operation.

Refreshable tactile surfaces other than the conventional Braille cell can be used to communicate in ASCII Braille, tactile dialects, and other tactile indicators.

Multiple active tactile cells may be effectively used to communicate complex information such as direction, sensor values, danger zones, alerts and so on. FIG. 12 shows another embodiment of the present invention with multiple tactile feedback cells 1220 positioned on the base 1210 of a smart watch 1200 facing the wearer's wrist 1230. A combination of the tactile feedback elements shown in FIG. 12 would provide information-rich, recognizable feedback to the control-ring operations of a smart watch.

The digitally controlled tactile elements may be positioned outside of the main body of a smart watch with a control-ring and user feedback mechanism. The tactile feedback may be delivered via external devices such as smart jewelry or clothing. FIG. 13 illustrates a smart watch 1300 with a control-ring 1350 wherein one or more active tactile elements 1320 are embedded in the base of the watch 1310 facing the wearer's wrist, while one or more digitally controlled tactile elements 1340 are embedded in the bracelet 1330, thus providing a rich tactile feedback environment to a smart watch with a control-ring and a user feedback mechanism.

What is claimed is:

1. A wearable device comprising:
   a controller that is configured to perform general calculations and data processing under a guidance of an operating system and one or more application software;
   a data storage communicatively coupled to the controller, the data storage being configured to store the one or more application software to be executed by the controller and one or more data sets associated with the controller;
   a digital display communicatively coupled to the controller, the digital display being configured to present text information and graphical information associated with an application of the one or more application software;
   a control-ring subsystem communicatively coupled to the controller, the control-ring subsystem being configured to detect a user interaction with a control-ring of the wearable device, the user interaction corresponding to at least a rotation of the control-ring; and
   a sensor assembly that includes one or more sensors communicatively coupled to the control-ring subsystem, the sensor assembly being configured to detect the user interaction, and
   a haptic feedback system communicatively coupled to the controller, the haptic feedback system including one or more single-point pressure actuators that are configured to communicate a state of the application other than an indication of a receipt of user input, and
   wherein, the control-ring subsystem is further configured to determine a user selection event based at least in part on the user interaction.

2. The wearable device of claim 1, wherein the control-ring subsystem includes a first control-ring that is configured to receive a first user interaction and a second control-ring that is configured to receive a second user interaction, the first control-ring corresponding to a front-facing control-ring and the second control-ring corresponding to a side-facing control-ring, and
   wherein the control-ring subsystem is further configured to:
      determine the user selection event based at least in part on a combination of the first user interaction and the second user interaction, the user selection event corresponding to one of a selection, completion of an action, or a cancelation of an action.

3. The wearable device of claim 1, wherein the control-ring subsystem is further configured to determine the user selection event based at least in part on the user interaction with the control-ring of the control-ring subsystem, the user selection event corresponding to one or more of (a) a discrete binary selection event, (b) a selection event corresponding to an alignment of a marker associated with the control-ring and a known fixed position on the wearable device, (c) a selection event indicating a positive or negative value change that is relative to a previously established value, (d) a selection event that corresponds to a directional vector, or (e) a selection event indicating progress along a continuum of values.

4. The wearable device of claim 1, wherein the control-ring subsystem is further configured to detect an additional user interaction that corresponds to at least one of a velocity, a rotational direction and a change in the rotational direction of the control-ring, or a rate of change of forceful pressure applied to the control-ring, and
   wherein, to determine the user selection event is further based at least in part on the additional user interaction.

5. The wearable device of claim 4, wherein the control-ring subsystem is further configured to determine a threshold velocity by which a rotation of the control-ring qualifies as the additional user interaction, the threshold velocity being based at least in part on prior user interactions with the control-ring.

6. The wearable device of claim 1, wherein the sensor assembly further configured to detect at least one of a current position or a change in position of the control-ring that occurs in response to receipt of the user interaction, the control-ring further including one or more visual markers that provide a visual indication of the current position of the control-ring,
   wherein, to determine the user selection event is further based at least in part on a detection of the current position or the change in position of the control-ring, and
   wherein the controller, via the operating system or the one or more application software, is further configured to cause the digital display to present at least one of the text information or the graphical information based at least in part on the user selection event.

7. The wearable device of claim 6, wherein the sensor assembly is further configured to detect a first alignment of the one or more visual markers on the control-ring with a marker shown on the digital display, or detect a second alignment of the one or more visual markers on the control-ring within a boundary shown on the digital display.

8. The wearable device of claim 6, wherein the one or more visual markers on the control-ring correspond to a light element or a display element, and
   wherein, the controller, via the operating system or the one or more application software, is further configured to cause the one or more visual markers to activate, deactivate, blink, change color, or change location on the control-ring.

9. The wearable device of claim 1, wherein the user interaction further corresponds to one of a forceable pressure applied to the control-ring, a single tap pressure applied to the control-ring, or a double tap pressure application to the control-ring.

10. A smart watch device comprising:
    a controller that is configured to perform general calculations and data processing via an operating system and one or more application software,
    a digital display communicatively coupled to the controller, the digital display being configured to present text information and graphical information associated with an application of the one or more application software,
    an input subsystem communicatively coupled to the controller, the input subsystem being configured to receive a user input via a control-ring subsystem, the control-ring subsystem being configured to detect a user interaction via rotation of a control-ring, and
    a haptic feedback system communicatively coupled to the controller, the haptic feedback system including one or more single-point pressure actuators that are configured to communicate a state of the application other than an indication of a receipt of user input.

11. The smart watch device of claim 10, further comprising:
    an actuator communicatively coupled to the controller, the actuator being configured to apply a variable amount of friction to the control-ring during the user interaction, and wherein the controller, via the operating system or the one or more application software, is further configured to set the variable amount of friction, based at least in part on the user interaction.

12. The smart watch device of claim 10, further comprising:
an actuator communicatively coupled to the controller, the actuator being configured to provide kinesthetic feedback by rotating the control-ring in a particular radial direction and for a particular circumferential distance, and
wherein, the controller, via the operating system or the one or more application software, is further configured to cause the actuator to rotate the control-ring in the particular radial direction and for the particular circumferential distance, based at least in part on a presentation of the text information or the graphical information on the digital display.

13. The smart watch device of claim 10, wherein
the one or more single-point pressure actuators are configured to provide tactile feedback that is associated with the user interaction, and
wherein, the controller, via the operating system and the one or more application software, is further configured to cause the one or more single-point pressure actuators to provide the tactile feedback, based at least in part on the user interaction.

14. The smart watch device of claim 10, wherein the haptic feedback system is further configured to selectively apply a pattern of variable vibration via the one or more single-point pressure actuators, the one or more single-point pressure actuators being embedded within the control-ring or a body of the smart watch device, and
wherein, the controller, via the operating system and the one or more application software, is further configured to determine a frequency and magnitude of the pattern of variable vibration based at least in part on the user interaction.

15. The smart watch device of claim 10, wherein the one or more single-point pressure actuators includes one or more refreshable Braille cells that are configured to provide tactile feedback associated with a presentation of the text information and the graphical information on the digital display, the one or more refreshable Braille cells being further configured to indicate characters of a six point Braille alphabet, eight-point ASCII Braille, Computer Braille, Nemeth Braille, or Unified English Braille.

16. The smart watch device of claim 15, wherein the one or more refreshable Braille cells are physically fixed to a position on the control-ring of the control-ring subsystem such that a rotation of the control-ring causes a same rotation of the one or more refreshable Braille cells.

17. The smart watch device of claim 15, wherein the one or more refreshable Braille cells are physically positioned within a body of the smart watch device or a dial of the smart watch device so as to provide multiple distinct channels of tactile feedback.

18. The smart watch device of claim 10, further comprising:
one or more pressure transducers communicatively coupled to the controller, the one or more pressure transducers being configured to provide tactile feedback to a user that indicates a passage of a significant point in time, and
wherein, the controller, via the operating system and the one or more application software, is further configured to cause the one or more pressure transducers to provide the tactile feedback.

19. The smart watch device of claim 10, wherein the haptic feedback system is configured to communicate at least one of the text information or the graphic information presented on the digital display via Morse code or another tactile-based encoding.

20. The smart watch device of claim 10, wherein the state of the application corresponds to at least one of the text information or the graphic information presented on the digital display, the text information or the graphic information being associated with at least one of a user interface feedback other than the menu selection, a textual message, or an alert.

* * * * *

UNITED STATES PATENT AND TRADEMARK OFFICE
CERTIFICATE OF CORRECTION

Page 1 of 1

PATENT NO. : 10,852,700 B2
APPLICATION NO. : 15/565902
DATED : December 1, 2020
INVENTOR(S) : Andrey Abramov It is certified that error appears in the above-identified patent and that said Letters Patent is hereby corrected as shown below:

In the Claims

Column 12, Lines 10:
The word "is" is missing between "assembly" and "further".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*